(12) United States Patent
Wakefield et al.

(10) Patent No.: US 7,130,170 B2
(45) Date of Patent: Oct. 31, 2006

(54) SYSTEM AND METHOD FOR FAULT CONTACTOR DETECTION

(75) Inventors: Scott Wakefield, Plano, IL (US);
Daniel Zuzuly, Geneva, IL (US); Scott Mayhew, North Aurora, IL (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 284 days.

(21) Appl. No.: 10/786,318

(22) Filed: Feb. 25, 2004

(65) Prior Publication Data
US 2005/0185350 A1 Aug. 25, 2005

(51) Int. Cl.
*H02H 5/04* (2006.01)
(52) U.S. Cl. ...................................... 361/23
(58) Field of Classification Search .................. 361/23, 361/33; 187/247
See application file for complete search history.

(56) References Cited

U.S. PATENT DOCUMENTS

| | | | | |
|---|---|---|---|---|
| 4,545,464 A | * | 10/1985 | Nomura | 187/296 |
| 4,681,190 A | * | 7/1987 | Toshiaki | 187/247 |
| 5,153,489 A | * | 10/1992 | Unsworth et al. | 318/490 |
| 5,341,080 A | * | 8/1994 | Agut Sanz | 318/778 |
| 5,684,377 A | * | 11/1997 | Kim et al. | 318/799 |
| 6,038,114 A | * | 3/2000 | Johnson | 361/23 |
| 6,201,369 B1 | * | 3/2001 | Johnson | 318/811 |

* cited by examiner

*Primary Examiner*—Brian Sircus
*Assistant Examiner*—Lucy Thomas

(57) ABSTRACT

A motor starter system comprises solid state switches for connection to an AC line for controlling application of AC power to the motor. A fault contactor has contacts. A motor wiring circuit operatively connects the solid state switches and fault contactor contacts with motor winding terminals. A voltage sensor senses AC line voltage and motor terminal voltage. A control circuit controls operation of the solid state switches and the fault contactor, including de-energizing the fault contactor in an off mode where AC line power is not supplied to the motor winding terminals. The control circuit detects AC line voltage and motor terminal voltage in the off mode and detect an error condition responsive to sensed AC line voltage being substantially different from motor terminal voltage in the off mode.

19 Claims, 5 Drawing Sheets

SYSTEM AND METHOD FOR FAULT CONTACTOR DETECTION

CROSS REFERENCE TO RELATED PATENT APPLICATIONS

The present U.S. Patent Application having at least one common inventor as
U.S. patent application Ser. No. 10/786,320 entitled "System and Method for Configuring a Soft Starter", and
U.S. patent application Ser. No. 10/786,319 entitled "System and Method for Providing Electrical System Monitoring and Diagnosis", and being filed with the U.S. Patent and Trademark Office concurrently on Feb. 25, 2004, the entirety of each is incorporated herein by reference.

FIELD OF THE INVENTION

This invention relates to a motor controller and more particularly, a system and method for fault contactor detection.

BACKGROUND OF THE INVENTION

Solid state starters/controllers have found widespread use for controlling application of power to an AC induction motor. The conventional starter/controller, referred to hereinafter as simply a starter or a controller, uses solid state switches for controlling application of AC line voltage to the motor. The switches may be thyristors such as silicon controlled rectifiers (SCRs) or triacs.

One application for a motor controller is as an elevator starter. The elevator starter may be used to drive a pump for an hydraulic elevator. Each time movement of an elevator car is commanded, then the starter must start the motor until it reaches operating speed and then operate in a run mode. Such a starter may only be used for the up direction as gravity may be used for the down direction.

One type of elevator starter, referred to as a soft starter, changes the on time of the solid state switches to control voltage and to ramp up motor current with a fixed connection. The soft starter may use a fault contactor to open the path for current to flow to the motor in instances where the soft starter might fail, such as a shorted SCR condition. However, there may be instances where the fault contactor control coil is not wired properly, which could result in a condition where the fault contactor does not open in a fault condition. This could result in a damaged motor. Another condition that may cause the contactor to remain in the on state could be welded contacts in the fault contactor or in the elevator control system.

The present invention is directed to solving one or more of the problems discussed above, in a novel and simple manner.

SUMMARY OF THE INVENTION

In accordance with the invention there is provided a system and method for fault contactor detection.

Broadly, there is disclosed herein a motor controller system comprising power switches for connection to an AC line for controlling application of AC power to the motor. A fault contactor has contacts. A motor wiring circuit operatively connects the power switches and fault contactor contacts with the motor winding terminals. Voltage sensors sense AC line voltage and motor winding terminal voltage. A control circuit controls operation of the power switches and the fault contactor, including selectively de-energizing the fault contactor in an off mode where AC line power is not supplied to the motor winding terminals. The control circuit measures AC line voltage and motor winding terminal voltage in the off mode and detects an error condition responsive to AC line voltage being substantially different from motor winding terminal voltage in the off mode.

It is a feature of the invention that the voltage sensors sense AC line to neutral voltage and motor winding terminal to neutral voltage.

It is another feature of the invention that the voltage sensor senses voltage for each winding of the motor and each phase of the AC line.

It is another feature of the invention that the motor wiring circuit electrically connects the power switches and fault contactor contacts in a delta configuration with the motor windings. The control circuit detects an error condition responsive to sensed AC line voltage having a different phase relationship from motor winding terminal voltage in the off mode.

It is another feature of the invention that the motor wiring circuit electrically connects the power switches and the fault contactor contacts in line with the motor windings. The control circuit detects an error condition responsive to sensed AC line voltage having a substantially different voltage level from motor winding terminal voltage level in the off mode.

There is disclosed in accordance with another aspect of the invention a motor starter system comprising solid state switches for connection to an AC line for controlling application of AC power to the motor. A fault contactor has contacts. A motor wiring circuit operatively connects the solid state switches and fault contactor contacts with motor winding terminals. A voltage sensor senses AC line voltage and motor terminal voltage. A control circuit controls operation of the solid state switches and the fault contactor, including de-energizing the fault contactor in an off mode where AC line power is not supplied to the motor winding terminals. The control circuit detects AC line voltage and motor terminal voltage in the off mode and detects an error condition responsive to sensed AC line voltage being substantially different from motor terminal voltage in the off mode.

Further features and advantages of the invention will be readily apparent from the specification and from the drawings.

DETAILED DESCRIPTION OF THE INVENTION

Figure 1:
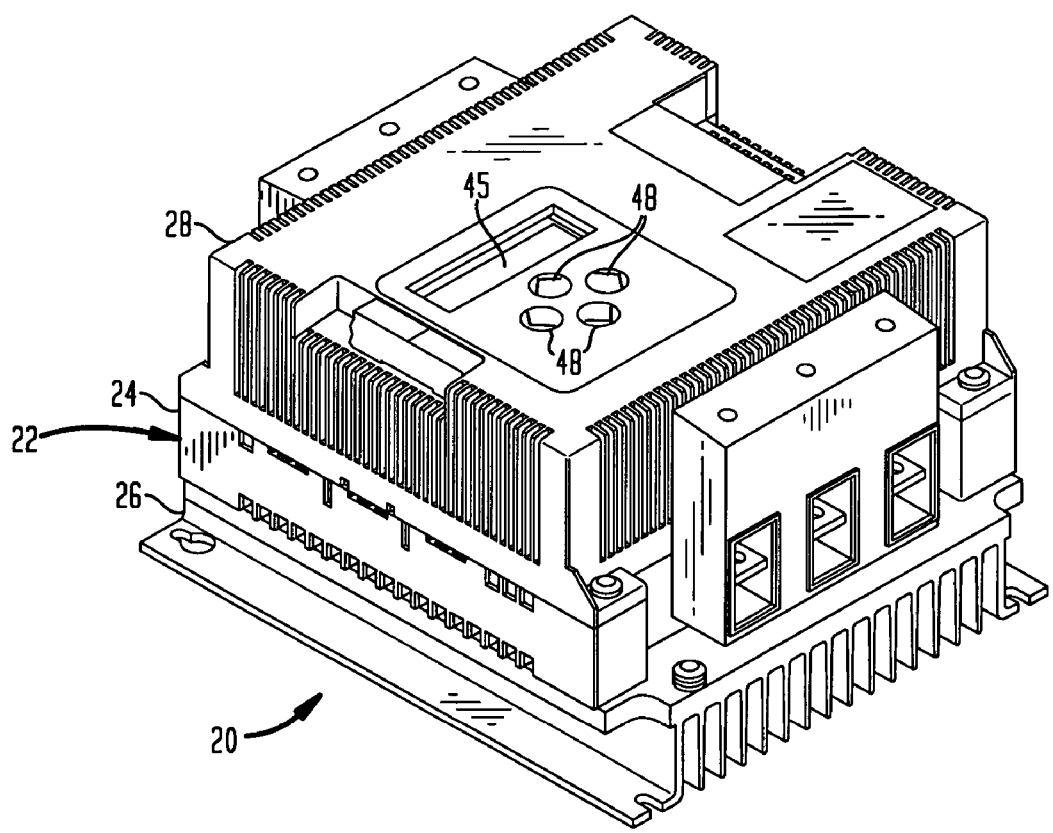
FIG. 1 is a perspective view of a motor controller in accordance with the invention.

Referring initially to FIG. 1, a solid state motor starter/controller 20, referred to hereinafter as simply a starter or a controller, is illustrated. One application for the controller 20 is as an elevator starter. The motor controller 20 may be used to drive a pump for an hydraulic elevator. Each time movement of an elevator car is commanded, the motor controller 20 must start the elevator motor until it reaches operating speed and then operate in a run mode. Such a motor controller 20 may only be used for the up direction as gravity may be used for the down direction.

The motor controller 20 comprises a housing 22 including a housing base 24, a heat sink 26 and a cover 28. The motor controller 20 includes a plurality of solid state power switches 32 in the form of thyristors, such as back to back connected silicon controlled rectifier (SCR) pairs, see FIG. 2. For simplicity herein, the SCR pairs 32 are referred to as simply SCRs. Triacs could also be used. The SCRs 32 control application of three phase AC line voltage to a three phase motor. As is apparent, a different number of SCRs 32 could be used to control different numbers of phases, as is apparent to those skilled in the art.

Figure 2:
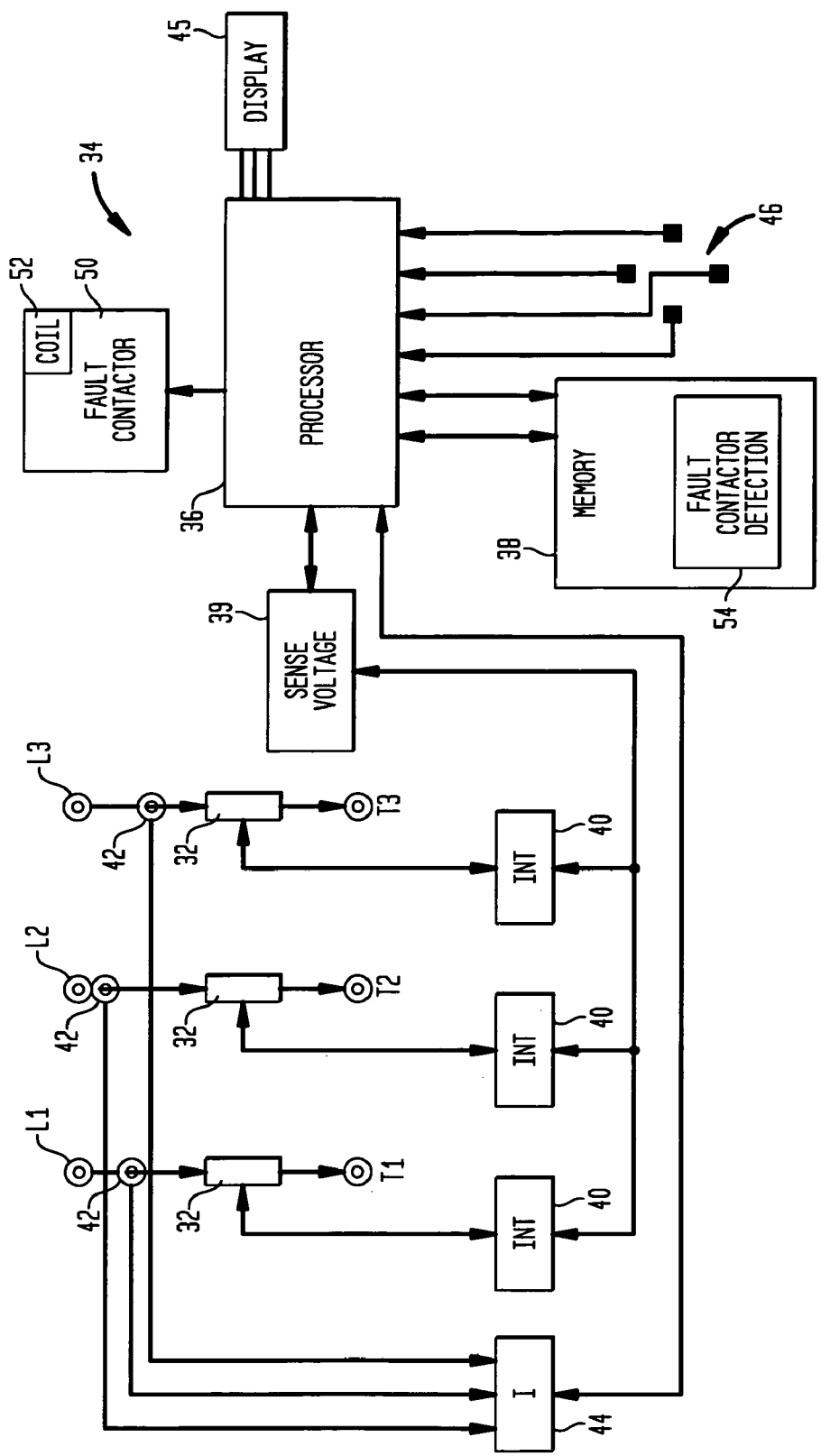
FIG. 2 is a block diagram of the motor controller of FIG. 1.

The SCRs 32 are mounted to the heat sink 26 within the housing 20. Referring also to FIG. 2, a control circuit 34 is also enclosed in the housing 20. The control circuit 34 controls operation of the SCRs 32. Particularly, the control circuit 34 includes a programmed processor 36, such as a digital signal processor, for commanding operation of the SCRs 32. A memory 38 is connected to the processor 36 and stores programs and configuration information relating to operation of the SCRs 32, as described below. As is apparent, the processor 36 may include program memory storing some or all of the programs and configuration information.

The processor 36 is connected via a sense voltage circuit 39 to three interface circuits 40 each for connection to one of the SCRs 32. Particularly, the interface circuits 40 comprise snubber circuits for driving the SCRs 32. The sense voltage circuit 39 senses line voltage and motor terminal voltage. Particularly, the sense voltage circuit 39 measures the line (L1, L2, L3) voltages and the motor terminal (T1, T2, T3) voltages relative to its own internally generated neutral in a conventional manner. A current transformer 42 senses current of each of the SCRs 32 and is connected to a current sense circuit 44. Other types of current sensors could be used. The current sense circuit 44 is also connected to the processor 36.

An LCD display 45 on the cover 22, see FIG. 1, is connected to the processor 36. The display 45 is used to indicate configuration settings, operating values, fault conditions, and the like. User actuable switches 46 are electrically connected to the processor 36. The user actuable switches 46 are actuated by actuator elements 48 on the housing cover 22, see FIG. 1. Particularly, the switches 46 are used for locally selecting parameters for stored configuration information.

The processor 36 is operatively connected to a fault contactor 50. The fault contactor 50 is conventional and includes a coil 52 operatively controlled by the processor 36 for controlling fault contacts FC1, FC2 and FC3, see FIG. 3. The processor 36 is programmed to turn off the fault contactor 50, as by de-energizing the coil 52, to open any path current may be flowing in instances where the soft starter might fail, such as a shorted SCR condition.

Figure 3:
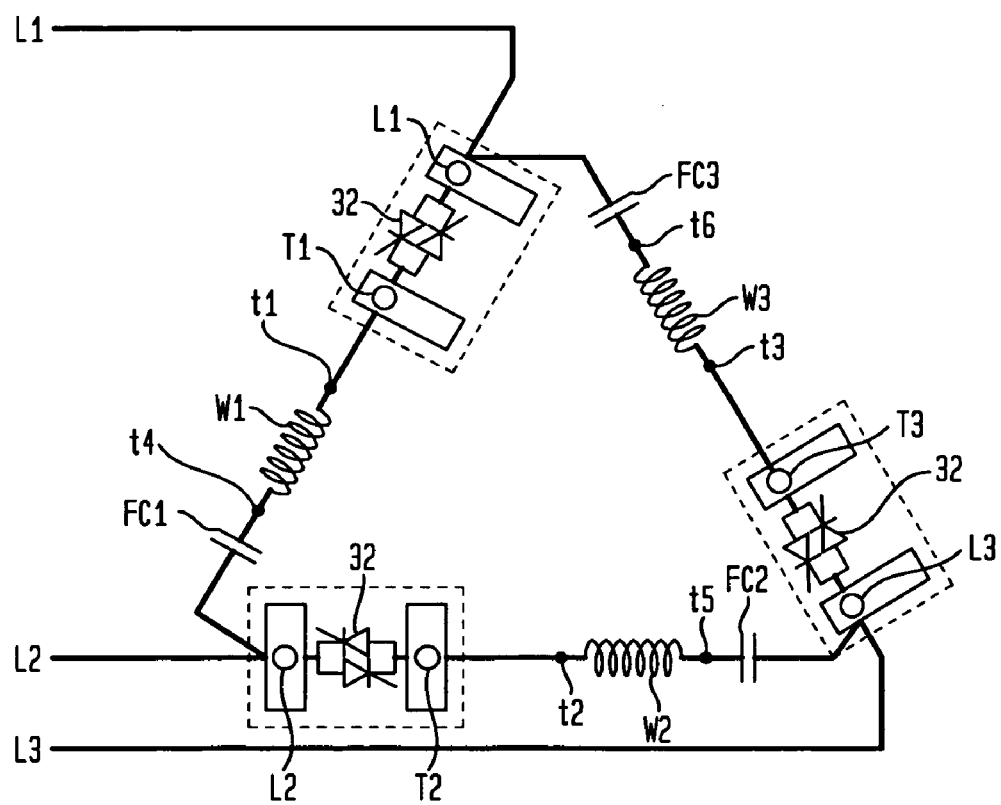
FIG. 3 is a wiring diagram of the motor controller of FIG. 1 connected to a motor in a delta configuration.

Referring to FIG. 3, an electrical schematic illustrates connection of the SCRs 32 of FIG. 2 to motor windings in a typical delta configuration. The terminals of the motor are referenced by a "t". All terminals of the controller 20 are referenced by "T" and "L" designations. Thus, each SCR 32 is connected between a pair of controller terminals, such as the terminals L1 and T1. For example, one of the SCRs 32 is connected between the first phase line voltage L1 and the first motor terminal t1. The first motor winding W1 is connected in series with the SCR 32 between the motor terminal t1 and another motor terminal t4. A fault contact FC1 is also connected in series. The other legs of the delta configuration are generally similar and are conventional in nature. As is apparent, other motor configurations could be used in connection with the disclosed system and method.

The processor 36 of FIG. 2 operates in accordance with a control program for controlling operation of the SCRs 32. Particularly, each SCR 32 is conventionally controlled to satisfy voltage and current requirements. This is done by altering the firing angle of the SCRs 32. As is conventional, the firing angle is controlled by the processor 36 to satisfy operating requirements. During start mode, the processor 36 ramps the current up by gradually advancing the firing angle in a time determined to satisfy preselect acceleration time and acceleration torque values up to a select starting current limit setting value. By adjusting the delay in firing the SCRs 32, the processor 36 can maintain this level. As the motor speed increases, the current begins to decrease. The processor 36 continually increases the voltage to offset the reduction in current. This maintains a constant current at the setting of the starting current limit switch. Subsequently during a run mode the control circuit 34 applies full voltage to the motor.

In accordance with the invention, the control program implements a novel system and method of fault contactor detection prior to motor starting for detecting an error condition.

Particularly, if the fault contactor 50 appears to be energized when it is supposed to be in an off mode, the controller 20 goes into a fault condition and does not allow the SCRs 32 to turn on. This check is done at power up or after a fault cycle.

The following Table 1 shows the relationship between motor and line voltages for phase A with a line to line voltage of 460 VAC.

TABLE 1

| | | | Delta L and T voltages | |
|---|---|---|---|---|
| Condition | Elevator SCRs | Fault Contactor | Voltage, L1-neutral | Voltage, T1-neutral |
| 1 | Off | Off | 266 @ 0° | ~266 @ 0° |
| 2 | Off | On | 266 @ 0° | 266 @ 120° |
| 3 | On | Off | 266 @ 0° | 266 @ 0° |
| 4 | On | On | 266 @ 0° | 266 @ 0° |

It should be noted that because of elevator starter snubber capacitance, the motor winding capacitance will affect how much motor terminal to neutral voltage is actually measured in the first condition.

Of the four conditions listed in Table 1, if condition 2 is present when condition 1 is supposed to occur, then it can be concluded that the fault contactor 50 is turned on when it is supposed to be off. A test is implemented by the controller 20 measuring the L1 and T1 voltage levels and phase relationships while the elevator starter SCRs 32 are off and the fault contactor 50 is assumed off. If the T1 to neutral voltage is 120° out of phase with the L1 to neutral voltage, then the fault contactor is energized when it is not supposed to be.

If a wiring fault is the primary concern, then the test can be done once when the unit is powered up. If welded fault contactor contacts are also of concern, then the check must be done every time the fault contactor has been de-energized, as in a fault condition.

In accordance with the invention, the control circuit 34 utilizes a fault contactor detection module 54, see FIG. 2, to recognize an error condition as described above.

Figure 4:
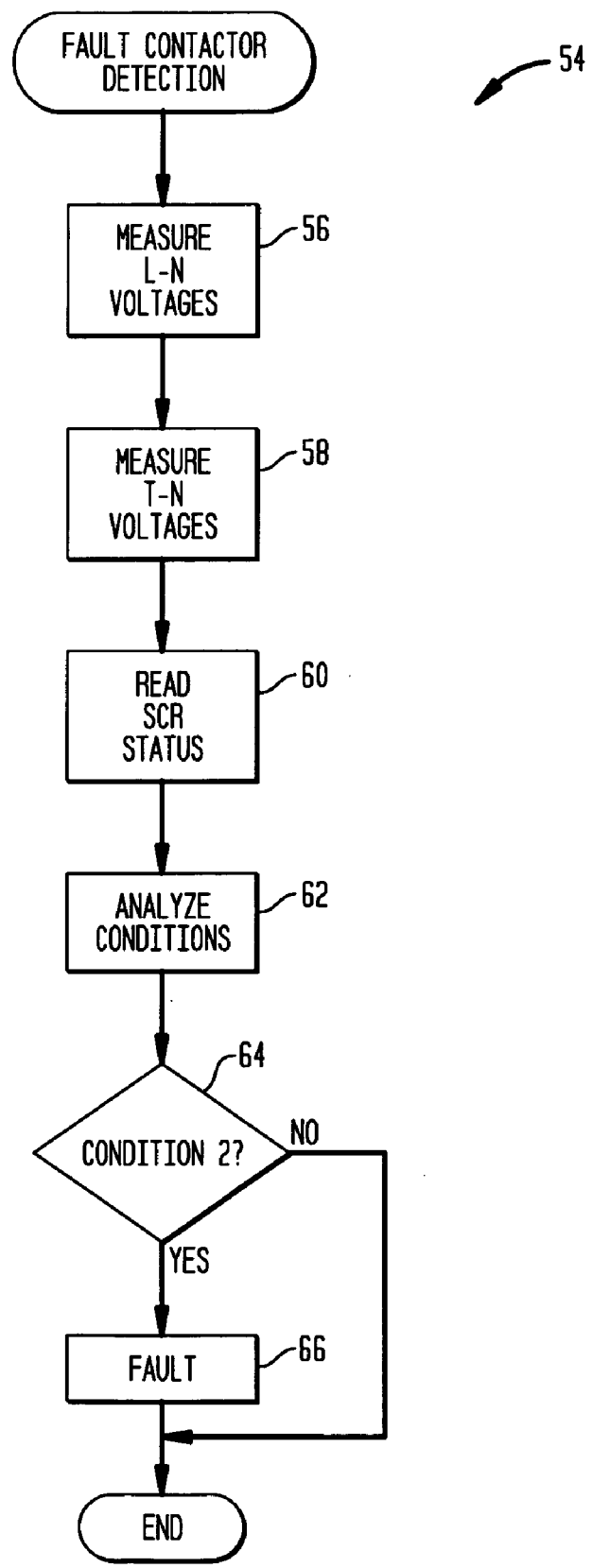
FIG. 4 is a flow diagram illustrating a fault contactor detection module implemented by the processor of FIG. 2.

Referring to FIG. 4, a flow diagram illustrates the program for the fault contactor detection module 54. The module 54 is implemented at power up or each time the fault contactor has been de-energized, referred to herein as an off mode. As will be apparent, the motor start operation includes conventional programming for basic operations. These programs are conventional in nature and are not discussed in detail herein.

The module 54 begins at a block 56 which measures the line to neutral voltages for each of the phases. Next, the motor winding terminal to neutral voltages are measured at a block 58 for each motor winding W1–W3. A block 60 reads the SCR status. A block 62 analyzes the various conditions using Table 1, above, for each phase. A decision block 64 determines if condition 2 has been detected for any phase when condition 1 is expected. If not, then the routine ends. If condition 2 is present when condition 1 is supposed to occur, then a fault is indicated at a block 66 and the routine ends.

Figure 5:
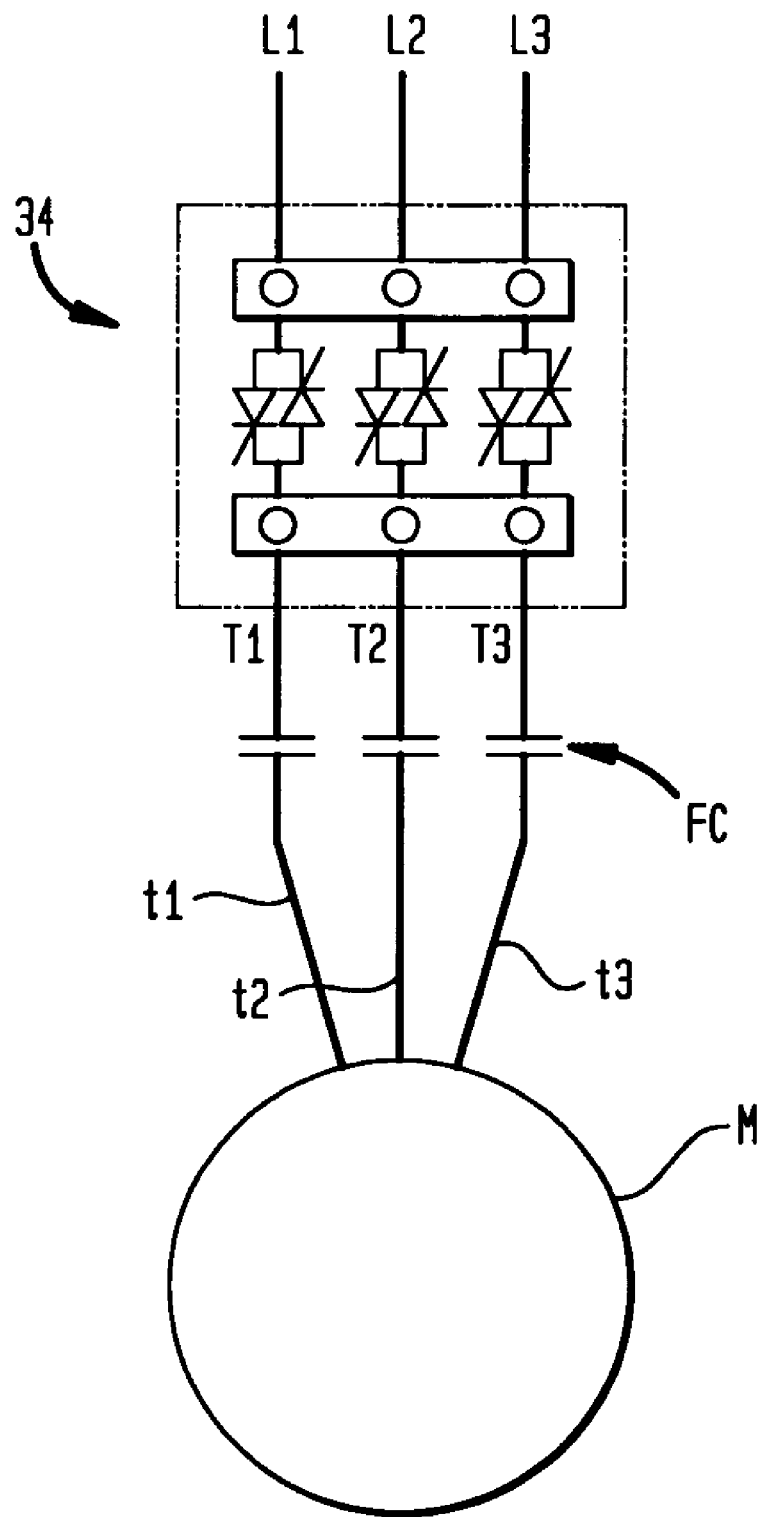
FIG. 5 is a wiring diagram for an alternative connection of the motor controller in line with a motor.

Referring to FIG. 5, an electrical schematic illustrates a portion of the control circuit 34 for connecting the starter in line with a motor M. The following Table 2 shows line and motor voltages for the in-line configuration of FIG. 5 for the various conditions. The test is similar to that discussed above, except that if the T1 to neutral voltage is 0 and the SCRs 32 are off, compared to the L1 to neutral voltage being 266 volts AC, then the fault condition exists.

TABLE 2

In-Line L and T voltages

| Condition | Elevator SCRs | Fault Contactor | Voltage, L1-neutral | Voltage, T1-neutral |
|---|---|---|---|---|
| 1 | Off | Off | 266 @ 0° | 266 @ 0° |
| 2 | Off | On | 266 @ 0° | 0 @ 0° |
| 3 | On | Off | 266 @ 0° | 266 @ 0° |
| 4 | On | On | 266 @ 0° | 266 @ 0° |

With the in-line configuration, the flow diagram of FIG. 4 is also implemented. For either case, an error condition is found responsive to sensed AC line voltage being substantially different from motor winding terminal voltage in the off mode. In the embodiment described with respect to Table 1, the substantial difference relates to the voltages being out of phase. With respect to the embodiment in Table 2, the substantial difference relates to voltage levels.

It can therefore be appreciated that a new and novel system and method for automatically detecting proper operation of a fault contactor in a motor controller has been described. It will be appreciated by those skilled in the art that, given the teaching herein, numerous alternatives and equivalents will be seen to exist which incorporate the disclosed invention. As a result, the invention is not to be limited by the foregoing exemplary embodiments, but only by the following claims.

We claim:

1. A motor controller system comprising:
   power switches for connection to an AC line for controlling application of AC power to the motor;
   a fault contactor having contacts;
   a motor wiring circuit for operatively connecting the power switches and fault contactor contacts with motor winding terminals;
   voltage sensors for sensing AC line voltage and motor winding terminal voltage; and
   a control circuit for controlling operation of the switches and the fault contactor, including de-energizing the fault contactor in an off mode where AC line power is not supplied to the motor winding terminals, the control circuit measuring AC line voltage and motor winding terminal voltage in the off mode and detecting an error condition responsive to sensed AC line voltage being substantially different from motor winding terminal voltage in the off mode.

2. The motor controller system of claim 1 wherein the voltage sensors sense AC line to neutral voltage and motor winding terminal to neutral voltage.

3. The motor controller system of claim 1 wherein the voltage sensors sense voltage for each winding of the motor and each phase of the AC line.

4. The motor controller system of claim 1 wherein the motor wiring circuit electrically connects the power switches and fault contactor contacts in a delta configuration with the motor windings.

5. The motor controller system of claim 4 wherein the control circuit detects an error condition responsive to sensed AC line voltage having a different phase relationship from motor winding terminal voltage in the off mode.

6. The motor controller system of claim 1 wherein the motor wiring circuit electrically connects the power switches and fault contactor contacts in line with the motor windings.

7. The motor controller system of claim 6 wherein the control circuit detects an error condition responsive to sensed AC line voltage having a substantially different voltage level from motor winding terminal voltage level in the off mode.

8. A motor starter system comprising:
   solid state switches for connection to an AC line for controlling application of AC power to the motor;
   a fault contactor having contacts;
   a motor wiring circuit for operatively connecting the solid state switches and fault contactor contacts with motor winding terminals;
   a voltage sensor for sensing AC line voltage and motor terminal voltage; and
   a control circuit for controlling operation of the solid state switches and the fault contactor, including de-energizing the fault contactor in an off mode where AC line power is not supplied to the motor winding terminals, the control circuit detecting AC line voltage and motor terminal voltage in the off mode and detecting an error condition responsive to sensed AC line voltage being substantially different from motor terminal voltage in the off mode.

9. The motor starter system of claim 8 wherein the voltage sensors sense AC line to neutral voltage and motor terminal to neutral voltage.

10. The motor starter system of claim 8 wherein the voltage sensors sense voltage for each winding of the motor and each phase of the AC line.

11. The motor starter system of claim 8 wherein the motor wiring circuit electrically connects the solid state switches and fault contactor contacts in a delta configuration with the motor windings.

12. The motor starter system of claim 11 wherein the control circuit detects an error condition responsive to sensed AC line voltage having a different phase relationship from motor terminal voltage in the off mode.

13. The motor starter system of claim 8 wherein the motor wiring circuit electrically connects the solid state switches and fault contactor contacts in line with the motor windings.

14. The motor starter system of claim 13 wherein the control circuit detects an error condition responsive to sensed AC line voltage having a substantially different voltage level from motor terminal voltage level in the off mode.

15. A method of fault contactor detection prior to motor starting comprising:
   providing solid state switches for connection to an AC line for controlling application of AC power to the motor;
   providing a fault contactor having contacts;
   electrically connecting the solid state switches and fault contactor contacts with motor winding terminals;
   sensing motor AC line to neutral voltage and motor terminal to neutral voltage;
   controlling operation of the solid state switches and the fault contactor prior to motor starting, including de-energizing the fault contactor in an off mode where AC line power is not supplied to the motor winding terminals, detecting AC line voltage and motor terminal voltage in the off mode and detecting an error condition responsive to sensed AC line voltage being substantially different from motor terminal voltage in the off mode.

16. The method of claim 15 wherein electrically connecting the solid state switches and fault contactor contacts with motor winding terminals comprises electrically connecting the solid state switches and fault contactor contacts in a delta configuration with the motor windings.

17. The method of claim 16 wherein detecting an error condition responsive to sensed AC line voltage being substantially different from motor terminal voltage in the off mode comprises detecting an error condition responsive to sensed AC line voltage having a different phase relationship from motor terminal voltage in the off mode.

18. The method of claim 15 wherein electrically connecting the solid state switches and fault contactor contacts with motor winding terminals comprises electrically connecting the solid state switches and fault contactor contacts in line with the motor windings.

19. The method of claim 18 wherein detecting an error condition responsive to sensed AC line voltage being substantially different from motor terminal voltage in the off mode comprises detecting an error condition responsive to sensed AC line voltage having a substantially different voltage level from motor terminal voltage level in the off mode.

* * * * *